(12) United States Patent
Inagaki

(10) Patent No.: US 11,470,215 B2
(45) Date of Patent: Oct. 11, 2022

(54) CONTROL DEVICE, STARTUP METHOD, AND ELECTRIC APPARATUS

(71) Applicant: TOSHIBA TEC KABUSHIKI KAISHA, Tokyo (JP)

(72) Inventor: Yasuhiro Inagaki, Mishima (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/126,804

(22) Filed: Dec. 18, 2020

(65) Prior Publication Data

US 2021/0400162 A1    Dec. 23, 2021

(30) Foreign Application Priority Data

Jun. 18, 2020    (JP) .............................. JP2020-105420

(51) Int. Cl.
*H04N 1/00* (2006.01)
*H04N 1/23* (2006.01)

(52) U.S. Cl.
CPC ..... *H04N 1/00896* (2013.01); *H04N 1/00204* (2013.01); *H04N 1/2315* (2013.01); *H04N 2201/0094* (2013.01)

(58) Field of Classification Search
CPC ........... H04N 1/00896; H04N 1/00204; H04N 1/2315; H04N 2201/0094
USPC ........................................................ 358/1.15
See application file for complete search history.

(56) References Cited

U.S. PATENT DOCUMENTS

| | | | |
|---|---|---|---|
| 9,563,444 B2 | 2/2017 | Utsumi | |
| 2013/0047019 A1* | 2/2013 | Higashi | ................. G06F 1/3284 713/323 |
| 2018/0241945 A1* | 8/2018 | Mimura | ............. H04N 5/23241 |

FOREIGN PATENT DOCUMENTS

JP    2014-232366 A    12/2014

\* cited by examiner

*Primary Examiner* — Neil R McLean
(74) *Attorney, Agent, or Firm* — Foley & Lardner LLP

(57) ABSTRACT

A control device includes a processor and a first storage portion. The processor executes a control process based on data stored in a main memory. The first storage portion stores a first memory image related to the main memory after a process of starting-up an operating system by the processor is completed. The control device loads the first memory image into the main memory if the operating system is started up.

12 Claims, 2 Drawing Sheets

CONTROL DEVICE, STARTUP METHOD, AND ELECTRIC APPARATUS

CROSS-REFERENCE TO RELATED APPLICATION

This application is based upon and claims the benefit of priority from Japanese Patent Application No. 2020-105420, filed on Jun. 18, 2020, the entire contents of which are incorporated herein by reference.

FIELD

Embodiments described herein relate generally to a control device, a startup method, and an electric apparatus.

BACKGROUND

In an electric apparatus whose operation is controlled by a control device equipped with a processor, hibernation for quickly returning to an operating state immediately before the power of the electric apparatus is turned off is already known. However, after the power of the electric apparatus is turned on, the processor is started, and then a process for recovery by hibernation is executed. Therefore, only a part of the start-up time required from turning on the power of the electric apparatus to being able to use the electric apparatus is shortened. Under those circumstances, it has been desired to reduce the time required to start the processor.

DETAILED DESCRIPTION

An object to be solved by the present disclosure is to provide a control device, a starting method, and an electric apparatus capable of shortening the time required for starting a processor.

In general, according to one embodiment, a control device includes a processor and a first storage portion. The processor executes a control process based on data stored in a main memory. The first storage portion stores a first memory image related to the main memory after a process of starting-up an operating system by the processor is completed. The control device loads the first memory image into the main memory if the operating system is started up.

Figure 1:
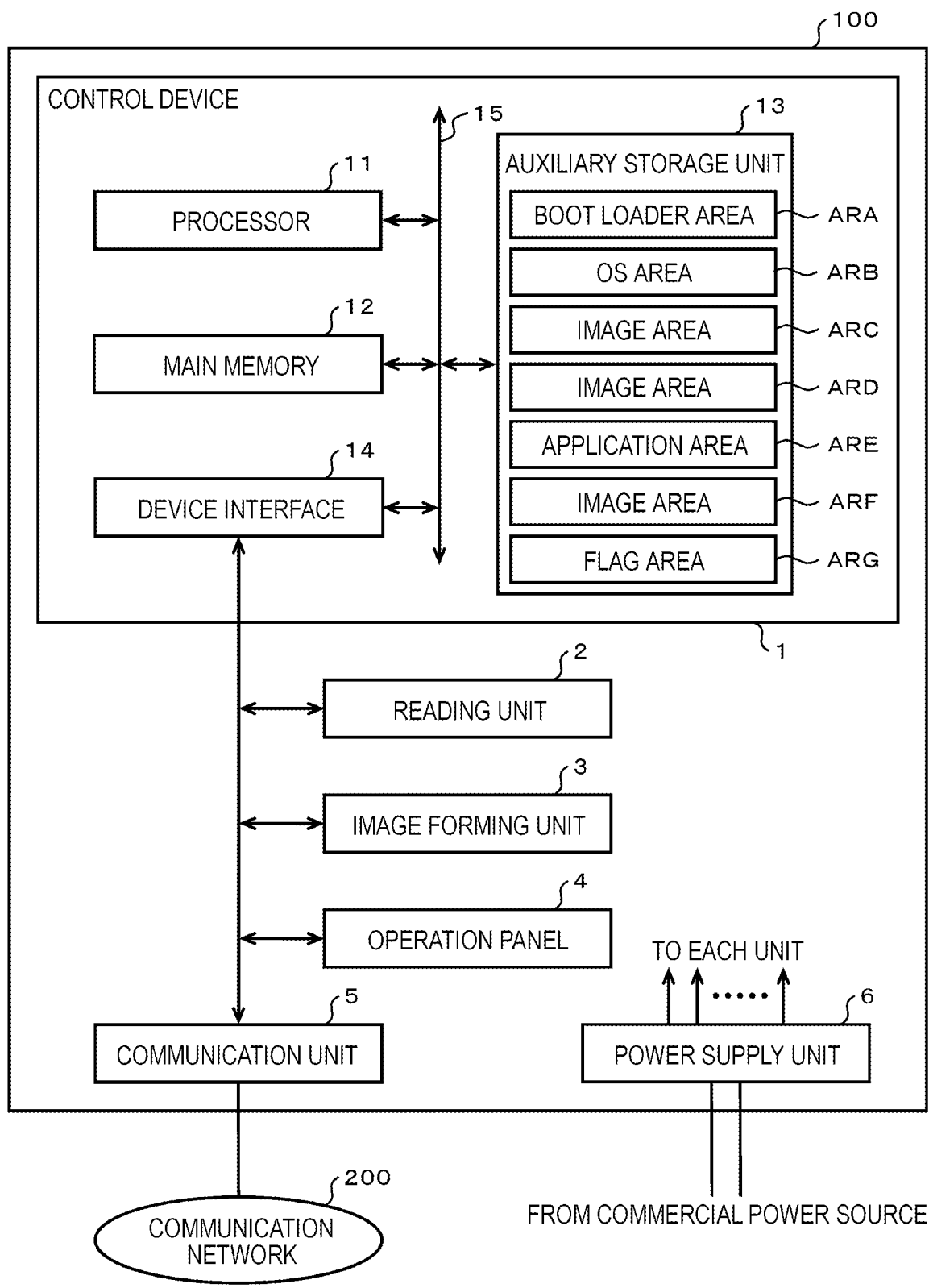
FIG. 1 is a block diagram illustrating a schematic configuration of a multifunction device according to an embodiment and a main circuit configuration of a control device.

Hereinafter, an example of an embodiment will be described with reference to the drawings. In this embodiment, a multifunction device will be described as an example of an electric device. FIG. 1 is a block diagram illustrating a schematic configuration of a multifunction device 100 according to the embodiment and a main circuit configuration of a control device 1. The multifunction device 100 includes the control device 1, a reading unit 2 (e.g., a scanner), an image forming unit 3 (e.g., a printer), an operation panel 4, a communication unit 5, and a power supply unit 6. The multifunction device 100 may include another device such as an IC card reader.

The control device 1 controls various devices provided in the multifunction device 100, such as the reading unit 2, the image forming unit 3, the operation panel 4, and the communication unit 5. That is, the control device 1 sets the multifunction device 100 as a control target device. The reading unit 2 reads an image formed on a medium, such as paper, and generates image data. As the reading unit 2, various well-known reading devices such as a flatbed scanner and an auto document feeder (ADF) scanner can be used alone or in combination.

The image forming unit 3 forms an image on a medium such as paper based on the image data generated by the reading unit 2, the image data received by the communication unit 5, or the image data generated by the control device 1. As the image forming unit 3, various well-known image forming devices such as a device that utilizes an electrophotographic method of printing or a device with that utilizes an inkjet method of printing can be used alone or in combination.

The operation panel 4 (e.g., a user interface) includes an input unit, a display unit, and a sound unit. The input unit receives an instruction from an operator. As the input unit, various well-known input devices such as a touch panel and a key switch can be used alone or in combination.

The display unit executes a display operation for notifying an operator of various information. As the display unit, various well-known display devices such as a liquid crystal display or a light emitting diode (LED) lamp can be used alone or in combination. The sound unit outputs various sounds for guidance and alarms. As the sound unit, various well-known sound devices such as a voice synthesis device or a buzzer can be used alone or in combination.

The communication unit 5 executes communication processing for communication via a communication network 200. The communication network 200 is, for example, a local area network (LAN). In this case, as the communication unit 5, various well-known communication devices for LAN can be used. However, as the communication network 200, various other networks such as the Internet, a virtual private network (VPN), a local area network (LAN), a public communication network, or a mobile communication network may be used. As the communication unit 5, a device adapted to the communication network 200 may be used. The power supply unit 6 receives the electric power supplied from the commercial power source and generates the operating electric power for various electric devices provided in the multifunction device 100.

The reading unit 2, the image forming unit 3, the operation panel 4, and the communication unit 5 are examples of devices to be controlled by the control device 1. The reading unit 2, the image forming unit 3, the operation panel 4, and the communication unit 5 may include a device to be controlled by the control device 1. For example, the reading unit 2 may include an automatic document conveyance device, and this automatic document conveyance device may be the control target of the control device 1. Further, for example, the image forming unit 3 may include a finisher and this finisher may be the control target of the control device 1. A device (not illustrated) such as the IC card reader described above, which may be included in the multifunction device 100 and is connected to the control device 1, may also be controlled by the control device 1.

The control device 1 includes a processor 11, a main memory 12, an auxiliary storage unit 13, a device interface 14, and a transmission line 15. The processor 11, the main memory 12, the auxiliary storage unit 13, and the device interface 14 can communicate with each other via the transmission line 15. Accordingly, the processor 11, the main memory 12, and the auxiliary storage unit 13 are connected by the transmission line 15, so that a computer for controlling the control device 1 is configured.

The processor 11 corresponds to the central part of the computer described above. The processor 11 executes information processing for realizing various functions of the control device 1 according to an information processing program such as an operating system, firmware, or an application program. The processor 11 is, for example, a central processing unit (CPU).

The main memory 12 corresponds to the main memory portion of the computer. The main memory 12 includes a non-volatile memory area and a volatile memory area. The main memory 12 stores the above-described information processing program in the non-volatile memory area. The main memory 12 may store data necessary for the processor 11 to execute information processing in a non-volatile or volatile memory area. The main memory 12 uses a volatile memory area as a work area in which data is appropriately rewritten by the processor 11. The non-volatile memory area is, for example, a read only memory (ROM). The volatile memory area is, for example, a random access memory (RAM).

The auxiliary storage unit 13 corresponds to the auxiliary storage portion of the computer described above. As the auxiliary storage unit 13, for example, a storage unit using a well-known storage device such as an electric erasable programmable read-only memory (EEPROM), a hard disk drive (HDD), or a solid state drive (SSD) can be used alone or in combination. The auxiliary storage unit 13 stores data used by the processor 11 to perform various processes, data created by the processes of the processor 11, and the like. The auxiliary storage unit 13 stores the information processing program described above.

Various devices provided in the multifunction device 100, such as the reading unit 2, the image forming unit 3, the operation panel 4, and the communication unit 5, are connected to the device interface 14. The device interface 14 executes communication processing for exchanging data with each of the connected devices under the control of the processor 11. As the device interface 14, for example, a well-known device compliant with the universal serial bus (USB) standard can be used. Further, as the device interface 14, a well-known device compliant with the wireless LAN standard may be used to exchange data with various devices by wireless communication. Further, as the device interface 14, a well-known interface device compliant with the peripheral component interconnect express (PCIe) standard can be used. The device interface 14 may be provided with a plurality of types of interface devices, and a plurality of devices to be connected to the control device 1 may be connected separately. The transmission line 15 includes an address bus, a data bus, a control signal line, or the like, and transmits data and control signals transmitted and received between each connected unit.

The control device 1 is configured by mounting the processor 11, the main memory 12, the auxiliary storage unit 13, and the device interface 14 on a printed circuit board on which the transmission line 15 is formed, for example. The processor 11, the main memory 12, the auxiliary storage unit 13, and the device interface 14 may be fixedly attached to the printed circuit board by soldering or the like, or may be detachably attached to a socket or slot attached to the printed circuit board. For example, the RAM included in the main memory 12 may be installed in a memory slot attached to a printed circuit board and made replaceable.

A part of the storage area of the auxiliary storage unit 13 is used as a boot loader area ARA, an operating system (OS) area ARB, image areas ARC and ARD, an application area ARE, an image area ARF, and a flag area ARG. The OS area ARB, the image areas ARC and ARD, the application area ARE, and the image area ARF are set as separate partitions, for example.

The boot loader area ARA stores the boot loader. The OS area ARB stores the operating system. This operating system may be any of the various existing operating systems. The image areas ARC and ARD respectively store first hibernation images described below. The application area ARE stores an application program described regarding control processing for controlling various devices to be controlled. The image area ARF stores a second hibernation image described below. The flag area stores an image flag described below.

Next, the operation of the multifunction device 100 configured as described above will be described. The operations for realizing various functions of the existing multifunction device such as the copy function, the scanner function, the printer function, and the facsimile function may be the same as those of the existing multifunction device and the description thereof will be omitted. Then, here, if the power of the multifunction device 100 is turned on, the operations related to the starting-up until the operations for the above-described various functions are started will be mainly described. The contents of the various processes described below are examples and it is possible to change the order of some processes, omit some processes, or add another process as appropriate. For example, in the following description, in order to explain the characteristic operation of the embodiment in an easy-to-understand manner, the description of some processes is omitted. For example, if some error occurs, processing for dealing with the error may be performed, but a description of such processing is omitted.

The multifunction device 100 is configured as one of a series product group including two models with different functional levels. For example, the multifunction device 100 can be configured as either a so-called standard function model or a high-performance model. Regardless of which model the multifunction device 100 is configured as, the control device 1 basically has the same hardware configuration. However, the capacity of the RAM included in the main memory 12 may differ depending on each model. Also, the revisions supported by the PCIe devices included in the device interface 14 may differ. The multifunction device 100 differs in at least a part of various devices to be controlled by the control device 1, such as the reading unit 2, the image forming unit 3, the operation panel 4, and the communication unit 5, depending on which model is configured. For example, as the image forming unit 3, in the high-performance model, a device faster than the standard function model may be used. Further, various devices to be controlled by the control device 1 may include an optional device. For example, a large-capacity storage device may be additionally included as a device to be controlled by the control device 1.

In the auxiliary storage unit 13, an operating system common to each model is written in the OS area ARB, for example, when the control device 1 is manufactured. In the image area ARC, a first image for the standard function model is written, for example, when the control device 1 is manufactured. In the image area ARD, a first image for the high-performance model is written, for example, when the control device 1 is manufactured. That is, the stored data for the OS area ARB, and the image areas ARC and ARD are common to both models.

An application program adapted to each of the standard function model and the high-performance model is selectively written in the application area ARE, for example, when the control device 1 is manufactured. In the image area ARF, the memory image of the main memory 12 is written as a second hibernation image by the processor 11 every time the power of the multifunction device 100 is turned off. An image flag indicating which of the two first hibernation images is valid is selectively written in the flag area ARG, for example, if the control device 1 is manufactured. In the case of the embodiment, the image flag is set to represent the image area ARC if the multifunction device 100 is configured as a standard function model (a first model). The image flag is set to represent the image area ARD if the multifunction device 100 is configured as a high-performance model (a second model). That is, the stored data for the application area ARE and the flag area ARG are different between the two models.

The multifunction device 100 after factory shipment may be remodeled due to maintenance work. In this case, as part of the maintenance work, the processor 11 rewrites the application program in the application area ARE, and the image flag in the flag area ARG under the instruction of an operator.

The first hibernation image is a memory image of the main memory 12 when the processor 11 completes the startup process of the operation based on the operating system. Therefore, the first hibernation image may change according to the hardware configuration of the control device 1 but is not affected by various devices to be controlled by the control device 1. Therefore, the first hibernation image is fixedly determined according to the model of the multifunction device 100.

Thus, the image areas ARC and ARD are an example of a first storage portion that stores the first hibernation image as the first memory image. It can be said that the auxiliary storage unit 13 provided with the image areas ARC and ARD is an example of the first storage portion. The image area ARF is an example of a third storage portion which stores the second hibernation image as the second memory image. It can be said that the auxiliary storage unit 13 provided with the image area ARF is an example of the third storage unit. The image flag is an example of identification data and the flag area ARG is an example of a second storage portion. It can be said that the auxiliary storage unit 13 provided with the flag area ARG is an example of the second storage portion.

If the power of the multifunction device 100 is turned on, the power supply to each part of the multifunction device 100 is started from the power supply unit 6. In response to this, the processor 11 starts operation and executes the boot firmware stored in the non-volatile memory area of the main memory 12 or a ROM (not illustrated). The boot firmware is, for example, a basic input output system (BIOS) or a unified extensible firmware interface (UEFI). The processor 11 initializes various devices included in the control device 1 based on the boot firmware, and then the processor 11 reads the boot loader stored in the boot loader area ARA of the auxiliary storage unit 13 into the main memory 12 and starts the execution of the boot loader separately from the boot firmware.

Figure 2:
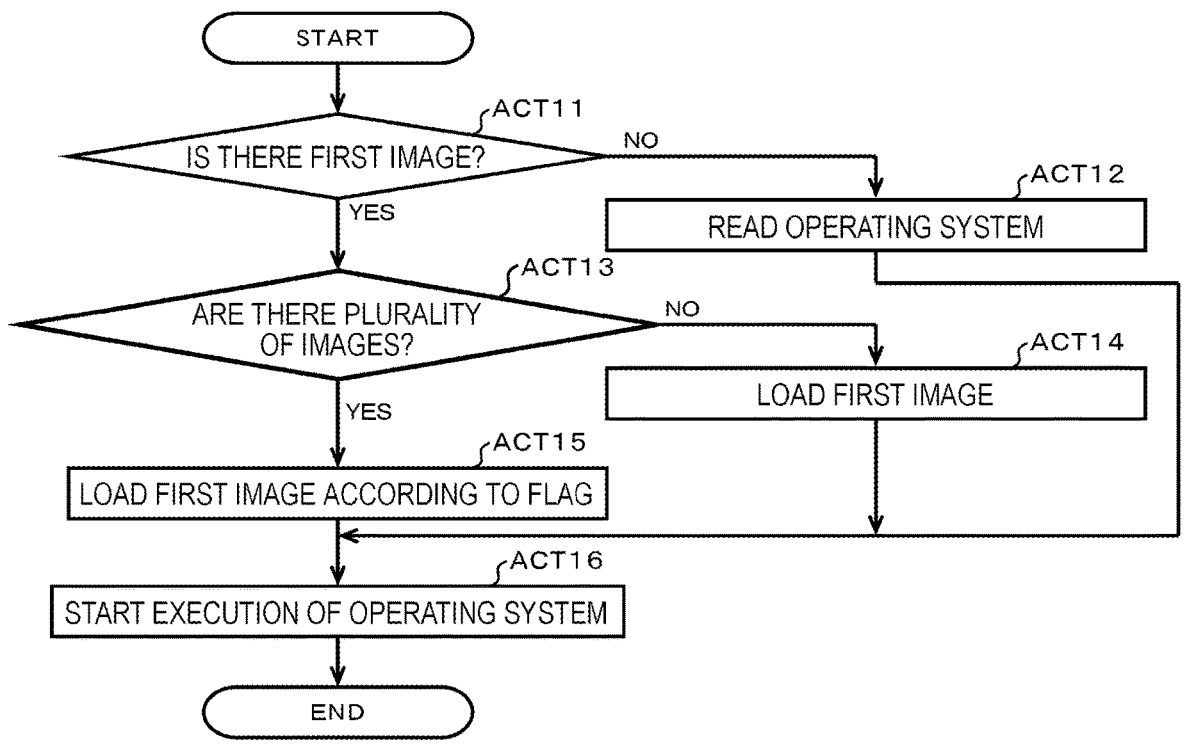
FIG. 2 is a flowchart of a boot loader.

FIG. 2 is a flowchart of the boot loader. As ACT 11, the processor 11 confirms whether there is the first hibernation image. Then, if it is confirmed that the first hibernation image is not stored in any of the image areas ARC and ARD, for example, the processor 11 determines NO and proceeds to ACT 12. As ACT 12, the processor 11 reads the operating system stored in the OS area ARB of the auxiliary storage unit 13 into the main memory 12.

On the other hand, if it is confirmed that the first hibernation image is stored in, for example, either of the image areas ARC and ARD, the processor 11 determines YES in ACT 11 and proceeds to ACT 13. As ACT 13, the processor 11 confirms whether there are a plurality of first hibernation images. For example, in the case of the embodiment, if it is confirmed that the first hibernation image is stored only in either of the image areas ARC and ARD, the processor 11 determines NO and proceeds to ACT 14. As ACT 14, the processor 11 loads the first hibernation image stored in either of the image area ARC or ARD into the main memory.

For example, in the case of the embodiment, if it is confirmed that there is a first hibernation image stored in each of the image areas ARC and ARD (i.e., there are a plurality of first hibernation images stored), the processor 11 determines YES in ACT 13 and proceeds to ACT 15. As ACT 15, the processor 11 selects one of the plurality of first hibernation images according to predetermined conditions and loads it into the main memory 12. For example, the processor 11 selects one of the image areas ARC and ARD according to the state of the image flag stored in the flag area ARG of the auxiliary storage unit 13, and then the processor 11 loads the first hibernation image stored in the image area into the main memory 12. By executing the boot loader by the processor 11, the computer having the processor 11 as a central part functions as a first loading portion which loads the first hibernation image as the first memory image into the main memory 12.

The processor 11 proceeds to ACT 16 in either case after reading the operating system in ACT 12 or after loading the first hibernation image in ACT 14 or ACT 15. As ACT 16, the processor 11 starts the execution of the operating system loaded in the main memory 12 separately from the boot loader. Then, the processor 11 ends the boot loader with this.

Figure 3:
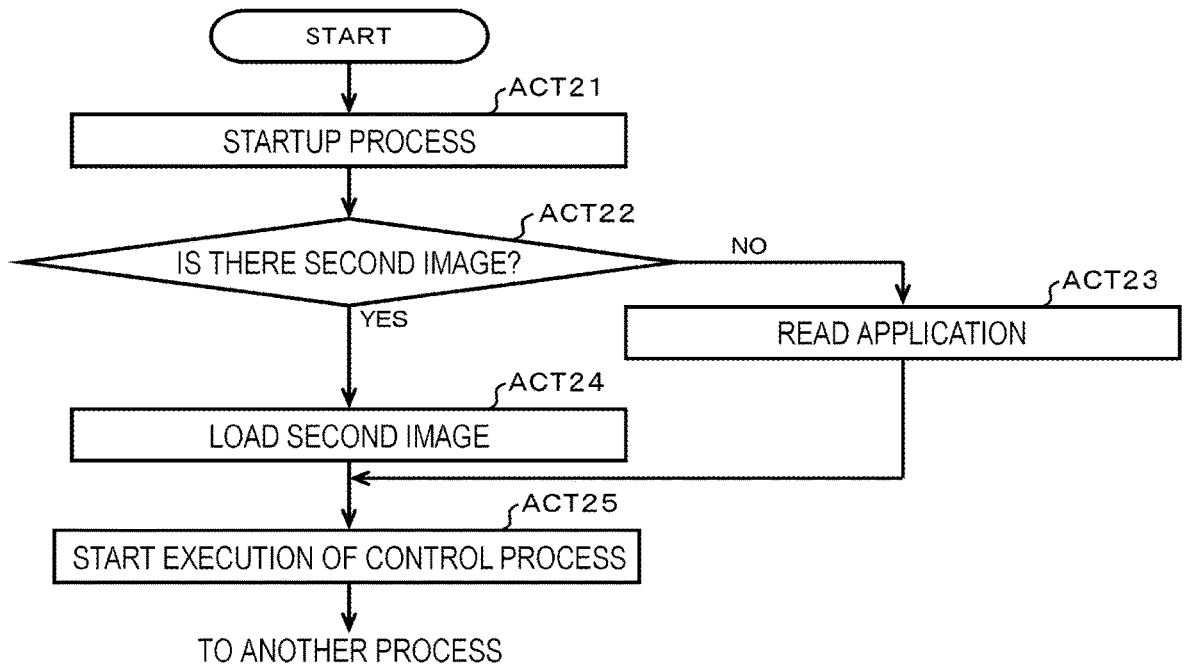
FIG. 3 is a flowchart of an operating system.

FIG. 3 is a flowchart of the operating system. If ACT 12 of FIG. 2 is executed by the boot loader, the main memory 12 is in an initial state of execution of the operating system. Therefore, if the processor 11 executes the operating system, it first proceeds to ACT 21. As ACT 21, the processor 11 performs a startup process. Details of this startup process will be omitted. The startup process causes the main memory 12 to be rewritten and its contents are affected by the difference in the hardware configuration of the control device 1. Then, the processor 11 proceeds to ACT 22 after this.

On the other hand, if ACT 14 or ACT 15 in FIG. 2 is executed by the boot loader, the main memory 12 is in a state where ACT 21 in FIG. 3 has already been completed. Therefore, if the processor 11 executes the operating system, it proceeds to ACT 22 without performing ACT 21. As ACT 22, the processor 11 confirms whether there is the second hibernation image. Then, if it is confirmed that the second hibernation image is not stored in the image area ARF, for example, the processor 11 determines NO and proceeds to ACT 23. As ACT 23, the processor 11 reads the application program stored in the auxiliary storage unit 13 into the main memory 12.

If it is confirmed that the second hibernation image is stored, for example, in the image area ARF, the processor 11 determines YES in ACT 22 and proceeds to ACT 24. As ACT 24, the processor 11 loads the second hibernation image stored in the image area ARF of the auxiliary storage unit 13 into the main memory 12. Thus, if the processor 11 executes the operating system, the computer with the processor 11 as the central part functions as a second loading portion which loads the second hibernation image as the second memory image into the main memory 12.

The processor 11 proceeds to ACT 25 in either case after reading the application program in ACT 23 or after loading the second hibernation image in ACT 24. By loading the second hibernation image, the application program is read into the main memory 12.

As ACT 25, the processor 11 starts the execution of the control process based on the application program separately from the operating system based on the stored data of the main memory 12. In this case, if the processor 11 proceeds from ACT 23 to ACT 25, the processor 11 starts the control process based on the application program from the initial state. Further, if the processor 11 proceeds from ACT 24 to ACT 25, the processor 11 returns to a control state immediately before the power of the multifunction device 100 is turned off last time. Next, the processor 11 then shifts to another process.

As described above, the control device 1 stores in advance the memory image of the main memory 12 when the processor 11 completes the startup process of the operation based on the operating system in the auxiliary storage unit 13 as the first hibernation image. Next, the boot loader loads the first hibernation image to the main memory 12 and then starts the execution of the operating system. As a result, the processor 11 can omit the startup process of the operating system and can complete the starting-up of the operating system in a shorter time than in the case where the startup process is performed. As a result, the time required for the starting-up of the processor 11 can be shortened.

Further, the control device 1 stores in advance the first hibernation image for the standard function model and the first hibernation image for the high function model in the auxiliary storage unit 13. Then, the above two first hibernation images are selectively loaded depending on whether the control device 1 is provided in the multifunction device 100 of the standard function model or the multifunction device 100 of the high-performance model. Therefore, it is not necessary to write the first hibernation image according to the model of the multifunction device 100 to the auxiliary storage unit 13 at the time of manufacturing or maintenance, and thus the effort related to manufacturing or maintenance is reduced.

Further, the control device 1 returns to the control state if the power of the multifunction device 100 is turned off by loading the second hibernation image to the main memory if starting the execution of the control process based on the application program. As a result, the time required for the starting-up of the processor 11 can be further shortened.

Further, the control device 1 reads the operating system in the boot loader if none of the first hibernation images is stored in the auxiliary storage unit 13. As a result, a model that does not store the first hibernation image in the auxiliary storage unit 13 and executes the startup process of the operating system every time the power of the multifunction device 100 is turned on can also be lined up in the series product group.

Further, in the boot loader, if only one first hibernation image is stored in the auxiliary storage unit 13, the control device 1 loads the one first hibernation image. As a result, the control device 1 can be applied to the multifunction device 100, which is an independent model that does not belong to the series product group.

Further, the control device 1 reads the application if the second hibernation image is not stored in the auxiliary storage unit 13 in the operation system. As a result, even when the second hibernation is not generated because the power of the multifunction device 100 is turned off due to an abnormality such as a power cut, the multifunction device 100 can be started up normally. It is also possible to enable operation without hibernation using the second hibernation image.

This embodiment can be modified in various ways as follows. Only one of the first hibernation images is stored in the auxiliary storage unit 13, and if the processor 11 determines YES in ACT 11 of FIG. 2, the processor 11 proceeds to ACT 14 and may not perform ACT 13 and ACT 15. In this case, the auxiliary storage unit 13 does not have to store the image flag.

The first hibernation image corresponding to each of the three or more models may be stored in the auxiliary storage unit 13. In this case, instead of the image flag, data for identifying any of the areas for storing three or more first hibernation images is stored in the auxiliary storage unit 13. Which of the plurality of first hibernation images is valid may be determined by the processor 11 by another method such as storing an identifier that identifies each of the plurality of first hibernation images in the auxiliary storage unit 13 or using a hardware setting switch.

The electrical device to be controlled by the control device 1 may be any device other than the multifunction device. Further, how the plurality of first hibernation images are used properly may be arbitrary. That is, the control device 1 may be mounted on any of a plurality of separate models which do not form a series, for example.

The loading of the second hibernation image to the main memory 12 may be performed by the boot loader.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device, comprising:
a processor configured to execute a control process based on data stored in a main memory;
a first storage configured to store a plurality of first memory images related to the main memory after a process of starting-up an operating system by the processor is completed, the first memory images each differing from one another; and
a second storage configured to store identification data,
the control device being configured to:
select one of the plurality of first memory images stored in the first storage based on the identification data; and
load the selected first memory image into the main memory after the operating system is started up.

2. The control device of claim 1, wherein the identification data is predetermined based on a model of a multifunction device associated with the control device.

3. The control device of claim 2, wherein:
the identification data identifies the multifunction device as either a first model or a second model; and
at least one of (a) the second model includes a device that operates faster than a device of the first model or (b) the second model includes a device that is not present in the first model.

4. The control device of claim 1, wherein the control device is incorporated in a control target apparatus including a plurality of devices, the control device further comprising:
a third storage configured to store a second memory image related to the main memory before a power supply of the control target apparatus is turned off,
wherein the control device is configured to load the second memory image into the main memory after the processor starts a process based on data that is stored within the main memory after the selected first memory image is loaded by the control device.

5. The control device of claim 4, wherein the plurality of devices include at least one of a reader or an image forming unit.

6. The control device of claim 1, further comprising:
a third storage configured to store a second memory image related to the main memory before the control device is turned off,
wherein the control device is configured to load the second memory image into the main memory after the processor starts a process based on data that is stored within the main memory after the selected first memory image is loaded by the control device.

7. An electric apparatus, comprising:
a control device; and
a plurality of devices operating under the control of the control device, the control device including:
a processor configured to execute a control process based on data stored in a main memory;
a first storage configured to store a plurality of first memory images related to the main memory after a process of starting-up an operating system by the processor is completed, the first memory images each differing from one another; and
a second storage configured to store identification data which identifies a hardware configuration that affects the process of starting-up the operating system,
the control device being configured to:
select one of the plurality of first memory images stored in the first storage based on the identification data stored in the second storage; and
load the selected first memory image into the main memory after the operating system is started up.

8. The electric apparatus of claim 7, further comprising:
a third storage configured to store a second memory image related to the main memory before the electric apparatus is turned off,
wherein the control device is configured to load the second memory image into the main memory after the processor starts a process based on data that is stored within the main memory after the selected first memory image is loaded by the control device.

9. The electric apparatus of claim 7, wherein the plurality of devices operating under the control of the control device include at least two of (a) a reader, (b) an image forming unit, (c) an operation panel, or (d) a communication unit.

10. A startup method for a control device that includes (a) a processor which executes a control process based on data stored in a main memory and (b) a first storage which stores a plurality of first memory images related to the main memory after a process of starting-up an operating system by the processor is completed, the first memory images each differing from one another, and the startup method comprising:
selecting one of the plurality of first memory images stored in the first storage;
loading the selected first memory image into the main memory when the operating system is started up;
starting, by the processor, execution of the operating system based on stored data within the main memory after the selected first memory image is loaded.

11. The startup method of claim 10, further comprising:
selecting the one of the plurality of first memory images stored in the first storage based on identification data stored in a second storage of the control device,
wherein the identification data identifies a hardware configuration of a device controlled by the control device.

12. The startup method of claim 10, further comprising:
accessing a second memory image related to the main memory that was previously stored prior to turning the control device off; and
loading the second memory image into the main memory after starting execution of the operating system.

* * * * *